United States Patent
Toda et al.

(10) Patent No.: US 7,130,256 B2
(45) Date of Patent: Oct. 31, 2006

(54) MARK-LENGTH INFORMATION RECORDING SYSTEM

(75) Inventors: Tsuyoshi Toda, Kodaira (JP); Takakiyo Yasukawa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 346 days.

(21) Appl. No.: 10/268,570

(22) Filed: Oct. 9, 2002

(65) Prior Publication Data
US 2003/0067856 A1    Apr. 10, 2003

(30) Foreign Application Priority Data
Oct. 9, 2001    (JP) .............................. 2001-310862

(51) Int. Cl.
*G11B 7/0045* (2006.01)
(52) U.S. Cl. .................................. 369/59.11
(58) Field of Classification Search ............... 369/47.5, 369/47.51, 47.52, 59.1, 59.11, 59.12, 59.13
See application file for complete search history.

(56) References Cited

U.S. PATENT DOCUMENTS

| | | | |
|---|---|---|---|
| 5,490,126 A | | 2/1996 | Furumiya et al. |
| 5,590,111 A | * | 12/1996 | Kirino et al. .............. 369/47.53 |
| 5,636,194 A | | 6/1997 | Furumiya et al. |
| 5,818,808 A | * | 10/1998 | Takada et al. .............. 369/116 |
| 5,905,695 A | * | 5/1999 | Kimura .................... 369/13.24 |
| 6,169,722 B1 | * | 1/2001 | Kikukawa et al. ........ 369/275.4 |
| 6,236,635 B1 | * | 5/2001 | Miyamoto et al. .......... 369/116 |
| 6,411,579 B1 | * | 6/2002 | Nobukuni et al. ........ 369/59.12 |
| 6,567,367 B1 | * | 5/2003 | Ohno et al. .................. 369/116 |

FOREIGN PATENT DOCUMENTS

| | | |
|---|---|---|
| JP | 06-295440 | 10/1994 |
| JP | 06-318321 A | 11/1994 |
| JP | 07-129959 | 5/1995 |
| JP | 07-225947 A | 8/1995 |
| JP | 09-134525 A | 5/1997 |
| JP | 10-241164 A | 9/1998 |
| JP | 11-345428 A | 12/1999 |
| JP | 2000-099950 A | 4/2000 |

* cited by examiner

*Primary Examiner*—Thang V. Tran
*Assistant Examiner*—Michael V. Battaglia
(74) *Attorney, Agent, or Firm*—Townsend and Townsend and Crew LLP

(57) ABSTRACT

The mark-length recording system whereby information is recorded by changing the lengths of a recorded portion and an unrecorded or erased portion has a problem that, when new information is recorded in an already recorded region, the newly recorded information may deteriorate in reliability because the length and width of the newly recorded mark are different from those of the previously recorded mark and a part may exist that is not completely erased at the time of overwriting. The invention widens a setting freedom of the recording power and controls the length and width of the recorded mark by making the effective recording pulse length (the length from a rise of a first pulse to a fall of a last pulse) satisfy a relation: (effective recording pulse length)< (recording code length, i.e., the length of data to be recorded)–2T(twice the reference clock cycle).

8 Claims, 3 Drawing Sheets

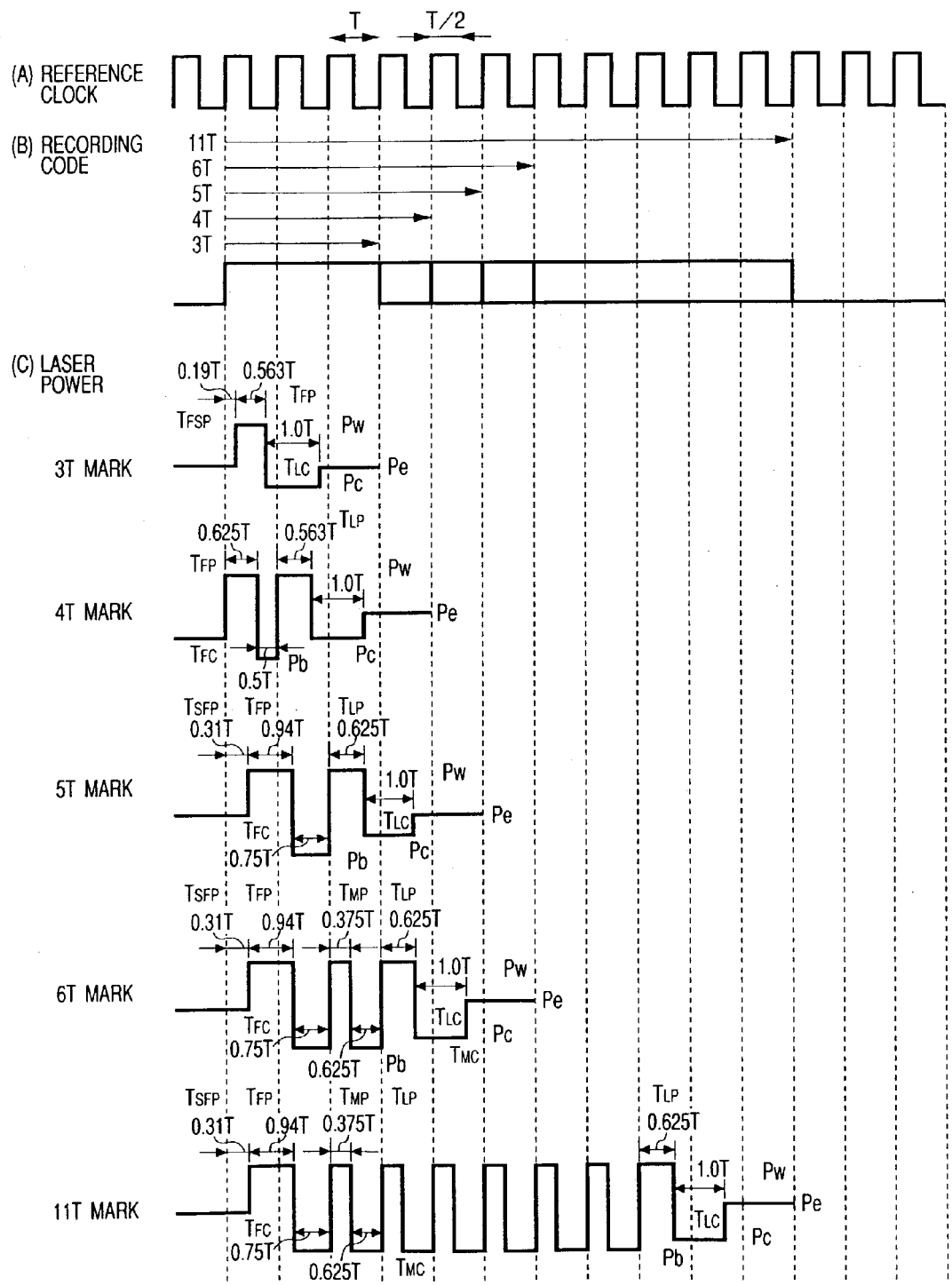

US 7,130,256 B2

MARK-LENGTH INFORMATION RECORDING SYSTEM

FIELD OF THE INVENTION

The present invention relates to an information recording and reproducing apparatus for recording and reproducing information on an information recording medium, and more specifically to an information recording method for recording information by a mark-length recording system with the use of laser light, and an information recording apparatus for such an information recording method.

BACKGROUND OF THE INVENTION

A technology of recording and reproducing information on/from the information recording medium using laser light has already achieved a practical use of an optical disk apparatus etc. As one method for a rewritable optical disk apparatus, there is a phase change type optical disk that utilizes a reversible phase change between crystalline and amorphous states. In order to obtain these two states, light of a high power (recording power) is irradiated on the recording medium, which is heated over a melting point and then is quenched quickly to convert to the amorphous state; light of an intermediate power (erasing power) lying between the above-mentioned high power and a reproducing power is irradiated on the recording medium, which is heated up to the crystallizing temperature and is cooled gradually to convert to a crystalline state. Therefore, overwriting can be performed with light of a single laser.

Conventionally, in the recording method based on the above-mentioned light irradiating method, as described in U.S. Pat. Nos. 5,490,126, 5,636,194, and the DVD-RAM JIS Standard (120 mm DVD Rewritable Disk JIS X 6243/P86, Attachment H, Definition of Writing Pulse), at least three power levels consisting of the recording power (high power level) for overwriting, the erasing power (medium power level), and the reproducing power for reducing thermal interference (low power level) are used; and the recording mark is classified into three kinds, namely a first part, an intermediate part, and a last part, and, an information is recorded by a recording pulse whose effective length (length from a rise of the first pulse to a fall of the last pulse) corresponds to the length of data to be recorded (recording code length). Further, this recording method adopts a recording method where, in the first part and in the last part, light of the above-mentioned recording power is irradiated for a constant period of time; in the intermediate part, light of the recording power and light of a power smaller than the recording power (erasing power) are switched alternately and irradiated so that the cycle thus created becomes smaller than the above-mentioned constant period of time; and after the light of the recording power irradiated in the last part, light of a power (reproducing power) lower than the erasing power is irradiated for a constant period of time to decrease the thermal interference.

SUMMARY OF THE INVENTION

In order to increase storage capacity in the next-generation optical disk, it is preferable that the size of a record mark is smaller than that of the present optical disk (for example, DVD-RAM Version 1.0/2.0). However, if the mark whose recording code length is of the order of 0.15 to 0.20 µm is intended to be recorded by a recording method for recording the mark whose recording code length is of the order of 0.42 to 0.615 µm (DVD-RAM Version 1.0/2.0), a mark of a length of the order of 0.21 to 0.28 µm is formed even using an apparatus that features a laser wavelength=0.405 µm and an NA=0.85. That is, there was a problem that a mark about 1.4-times larger than the targeted recording code length is formed. Further, even when the recording is performed using the above-mentioned recording method with reduced laser output, it is difficult to avoid the problem that a mark whose length is 1.4-times larger than the recording code length of the targeted mark is formed. Moreover, if the recording is performed with a laser output that can make the mark agree with the recording code length, there is a problem that a sufficient mark width cannot be obtained, which causes decrease in the signal amplitude at the time of reproducing and hence reduce in the signal-to-noise ratio, and consequently the reliability of the information is impaired and the like.

It is the object of the present invention to provide an information recording method whereby a recording operation of recordable optical disk (e.g., DVD-R) or rewritable optical disks (i.e., DVD-RAM and DVD-RW), in both of which the information is recorded with a recording code length shorter than that of the current optical disk, is controlled appropriately and also an information recording apparatus for such an information recording method.

In order to attain the above-mentioned object, the recording method according to one aspect of the present invention is a method for recording data on an optical disk by irradiating laser light on the optical disk and forming a mark whose length is an integral multiple of the reference clock length, characterized in that, as irradiation powers, the above-mentioned laser can irradiate the optical disk at any one of four laser powers that satisfy a relation:

first power>second power>third power>fourth power, and a sum of the lengths of a pulse of the above-mentioned first power and of a pulse of the above-mentioned fourth power at the time of forming the mark is made to be shorter than the length of the mark minus twice the reference clock length.

Further, the recording method according to another aspect of the present invention is a method for recording the data on an optical disk by irradiating laser light on the optical disk and forming a mark whose length is an integral multiple of the reference clock length, characterized in that, as irradiation powers, the above-mentioned laser can irradiate the optical disk at any one of four laser powers that satisfy a relation:

first power>second power>third power>fourth power, and the length of a first pulse of the first power at the time of forming the mark is made to be shorter than twice the length of a pulse of the fourth power that follows the first light of the first power.

Moreover, the recording method according to still another aspect of the present invention is a method for recording the data on an optical disk by irradiating laser on the optical disk and forming a mark whose length is an integral multiple of the reference clock length, characterized in that, as irradiation powers, the above-mentioned laser can irradiate the optical disk at any one of four laser powers that satisfy a relation:

first power>second power>third power>fourth power, and the length of a first pulse of the fourth power at the time of forming the mark is made to be longer than the length of a pulse of the fourth power that follows the first pulse of the fourth power.

BRIEF DESCRIPTION OF THE DRAWINGS

FIG. 3 is a recording waveform chart in the one embodiment according to the present invention.

DETAILED DESCRIPTION OF THE PREFERRED EMBODIMENTS

Figure 1:
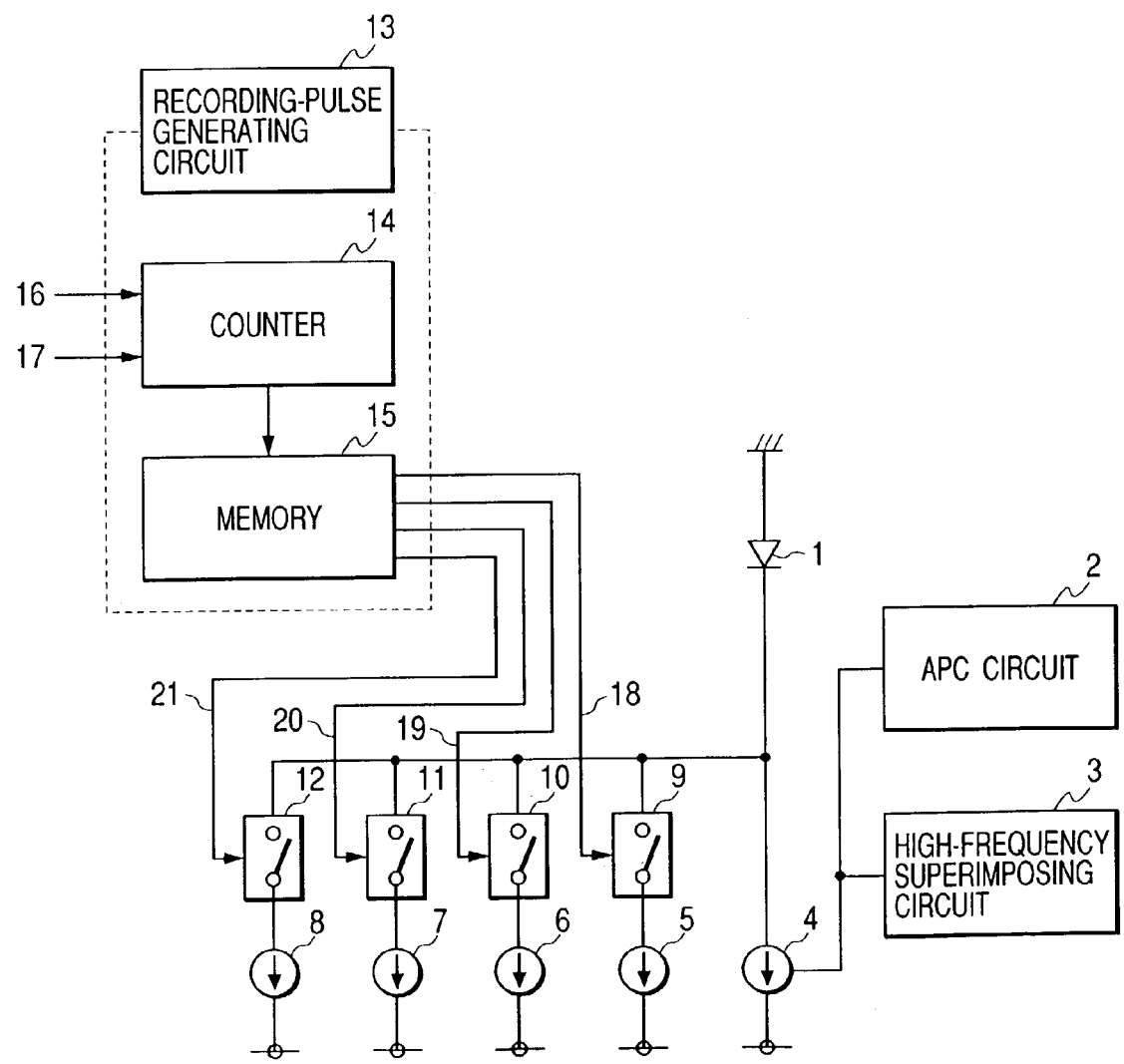
FIG. 1 is a block diagram of an information recording apparatus in one embodiment according to the present invention.

FIG. 1 shows the block diagram of the one embodiment of the information recording apparatus that implements the recording method according to the present invention. In the block diagram, the numeral 1 is a laser, the numeral 2 is an APC (Auto Power Control) circuit, the numeral 3 is a high-frequency superimposing circuit, the numeral 4 is a current source for reproducing, the numeral 5 is a first recording current source, the numeral 6 is a second recording current source, the numeral 7 is a third recording current source, the numeral 8 is a fourth recording current source, the numeral 9 is a first switch, the numeral 10 is a second switch, the numeral 11 is a third switch, the numeral 12 is a fourth switch, the numeral 14 is a counter, the numeral 15 is a memory, the numeral 13 is a recording pulse generating circuit composed of the counter 14 and the memory 15, the numeral 16 is a reference clock, the numeral 17 is a sequence of recording codes, the numeral 18 is a first recording pulse, the numeral 19 is a second recording pulse, the numeral 20 is a third recording pulse, and the numeral 21 is a fourth record pulse.

At the time of reproducing, the laser 1 is oscillated at a reproducing power level Pr by the APC circuit 2. The high-frequency superimposing circuit 3 is provided to reduce laser noise arising from the laser 1, but the high-frequency superimposition maybe stopped at the time of recording/erasing from the viewpoint of a laser life. At the time of recording, the switches 9–12 for controlling the currents from the recording current sources 5–8 are controlled by four kinds of recording pulses 18–21, which enables the laser 1 to emit the laser power necessary for recording the information. The memory 15 stores combinations of recording pulses (hereinafter referred to as the recording pulse trains) used to form nine kinds of marks of 3T (channel bits) to 11T, which are necessary in the mark-length recording system, and outputs a recording pulse train in response to an input from the counter 14. The reference clock 16 and the sequence of recording codes 17 that is information to be recorded are inputted into the counter 14, where the sequence of recording codes 17 is decomposed into marks (recorded portions) and spaces (erased portions) to be recorded in synchronization with the reference clock 16, the recording code length is counted, and consequently the memory 15 outputs a recording pulse train that corresponds to the recording code length.

Figure 2:
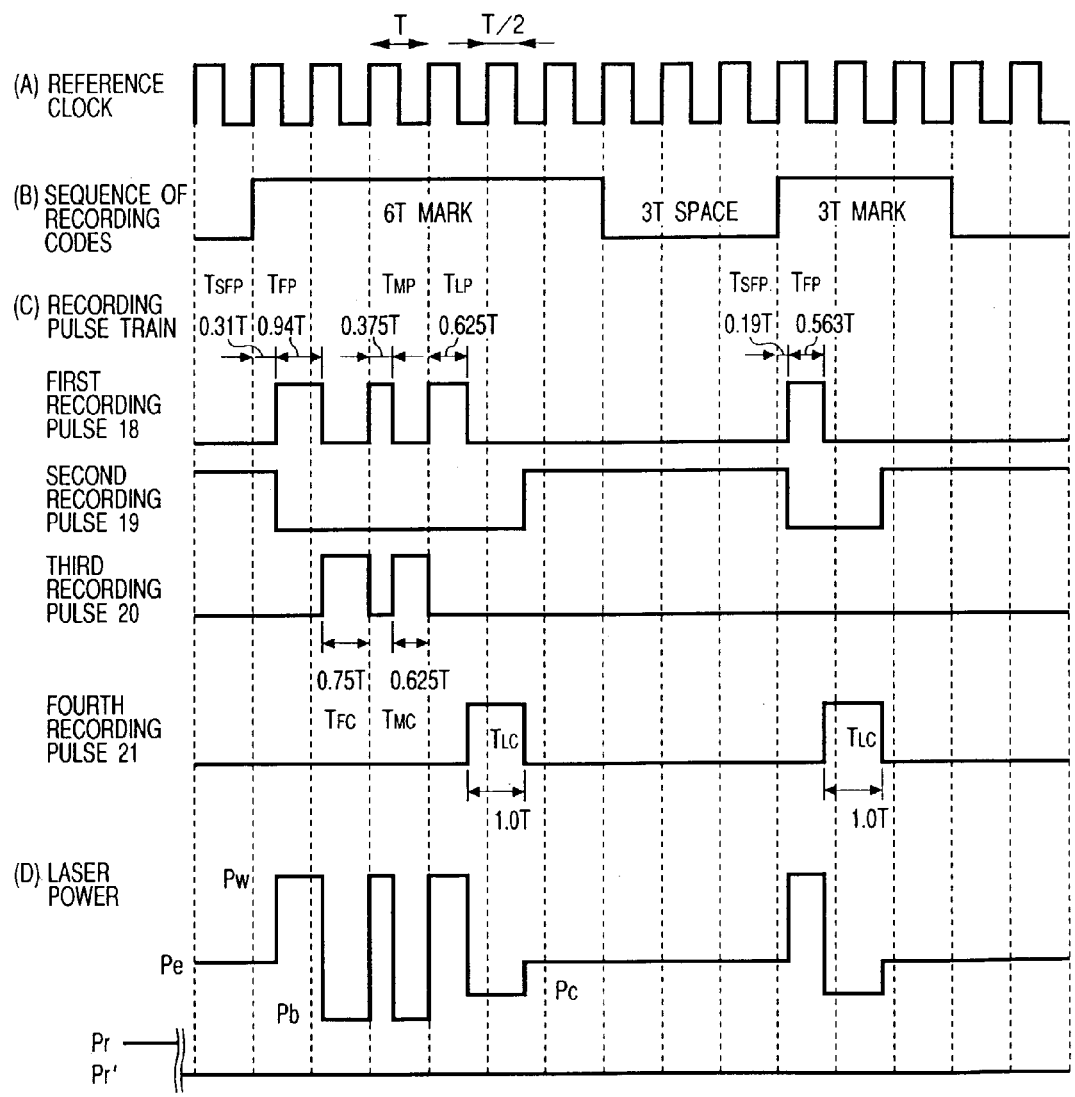
FIG. 2 is a waveform chart for explaining the recording method in the one embodiment according to the present invention.

An outline of the combination of the control signal and the recording waveform length at the time of recording 3T and 6T marks on the optical disk, where the information is recorded with a recording code length shorter than that of the current optical disk, will be described referring to FIG. 2. FIG. 2(A) and FIG. 2(B) show the reference clock 16 and the sequence of recording codes 17, respectively, which are inputted into the counter 14. The counter 14 decomposes the sequence of recording codes 17 into the recorded (mark) portions (H level) and erased (space) portions (L level) at positions of the rise or fall of the reference clock 16, and counts the recording code length; and then, the memory 15 outputs a recording pulse train corresponding to the recording code length. FIG. 2(C) shows the recording pulse outputted from the memory 15, and FIG. 2(D) shows a laser power emitted from the laser 1 to the optical disk.

Here, the first recording pulse 18 has a power level of Pw (recording power level), the second record pulse 19 has a power level of Pe (erasing power level), the third recording pulse 20 has a power level of Pb, and the fourth recording pulse 21 has a power level of Pc. At the time of recording 3T and 6T marks, the high-frequency superimposing circuit 3 is stopped, a power level Pr' that is maintained by the APC circuit 2 is used as a base power, on which the power levels (Pw, Pe, Pc, Pb) are superimposed. Here Pr' is a power level when the high-frequency superimposition circuit is stopped, and this power level is lower than the reproducing power level Pr. Further, for the space portions, the power level of Pe is superimposed on the power level of Pr' and is irradiated on the optical disk.

In the intermediate part of a portion where the 3T mark is to be formed (when the second recording pulse is off), the light at the power level of Pw heats up the recording medium, and the light at the power level of Pc suppresses the thermal interference and also controls shapes of front and rear ends of the mark that is being formed on the recording medium. Further, in the intermediate part of a portion where the 6T mark is to be formed, the light at the power levels of Pw, Pb, and Pc controls the shapes of front and rear ends of the mark that is being formed on the recording medium. That is, at the time of recording 3T and 6T marks, the laser light is irradiated on the recording medium at the laser powers shown in FIG. 2(D).

The details of the control signal and the recording waveform length at the time of the recording of the optical disk on which the information is recorded with a recording code length shorter than that of the current optical disk will be described referring to FIG. 3. The 8/16 modulation is one whereby information is recorded using marks and spaces of 3T to 11T. Although the laser powers corresponding to the recording codes of 3T to 5T are made to vary intricately as shown in the figure, the laser powers for the recording codes of 6T to 11T are such that a pulse train ($T_{MP}$, $T_{MC}$) synchronized with the reference clock 16 is added to the recording code 5T by the difference number of cycles between the recording code 5T and a recording code in question. Here, the laser is driven alternately at two power levels of Pw and Pb. The reason why similar waveforms are used for 6T and thereafter is that the size (the length) of the mark that is formed depends on outflow of the heat in the recording medium, the size of the irradiated light spot, and the length of the mark to be formed. Hereafter, the effective recording pulse length for each recording code etc. will be described concretely referring to FIG. 3(C).

First, in order to form the recording code 3T, the light is irradiated at the recording power Pw for a first pulse length $T_{FP}$=0.563T. The effective recording pulse length consists of the first pulse length $T_{FP}$, and needs to be shortened from the recording code length by the amount: (recording code length 3T)−$T_{FP}$=2.437T as a control in the time-axis direction.

For the recording code 4, the effective recording pulse length becomes 1.688T that is a sum of the lengths of three kinds of pulses: a first pulse length $T_{FP}$=0.625T, a first cooling pulse length $T_{FC}$=0.5T, and a last pulse length $T_{LP}$=0.563T, and it needs to be shortened from the recording code length by the amount: (recording code length 4)−(effective recording pulse length)=2.312T as a control in the time-axis direction. Further, the ratio of the first pulse length to the first cooling pulse length ($T_{FP}/T_{FC}$) is 1.25.

The effective recording pulse length for the recording code 5T is 2.315T, which is a similar recording waveform as the recording code 4. Also in this case, as with the recording code 4, the effective recording pulse length needs to be shortened from the recording code length by 2.685T as a control in the time-axis direction. Further, a ratio of the first pulse length to the first cooling pulse length ($T_{FP}/T_{FC}$) is approximately 1.25.

For the recording code 6T, the effective recording pulse length becomes 3.315T that is a sum of the lengths of five kinds of pulses: a first pulse length $T_{FP}$=0.94T, a first cooling pulse length $T_{FC}$=0.75T, an intermediate pulse length $T_{MP}$=0.375T, an intermediate cooling pulse length $T_{MC}$=0.625T, and a last pulse length $T_{LP}$=0.625T, and it needs to be shortened from the recording code length by the amount: (recording code length 6T)−(effective recording pulse length)=2.685T as a control in the time-axis direction. Further, the ratio of the first pulse length to the first cooling pulse length ($T_{FP}/T_{FC}$) is approximately 1.25 as with the case of the recording code 5T. Moreover, the ratio of the first cooling pulse length to the intermediate cooling pulse length ($T_{FC}/T_{MC}$) is 1.2.

For the recording codes 7T to 11T, the recording waveforms are ones that a combination of the intermediate pulse length $T_{MP}$=0.375T and the intermediate cooling pulse length $T_{MC}$=0.625T is added to the intermediate part of the recording waveform for the recording code 6T, one by one, respectively.

By performing such recording waveform control as explained in the forgoing, a heat storage effect can be kept constant and the width of the mark can be controlled constant regardless of the length of a recording code. This control is extremely effective for the mark-length recording system where a mark smaller than a light spot size that is defined by λ/NA is used as a shortest mark. Further, also in the hindmost part of the mark, both a shape of the rear end of the mark formed in the recording medium and the thermal interference can be controlled by the fourth recording pulse 21, so that a mark whose recording code length is of the order of 0.15 to 0.20 μm can be recorded adequately.

Note that, although this embodiment adopts a configuration in which recording pulse trains corresponding to the nine kinds of recording code lengths of 3T to 11T are stored, the embodiment may adopt a configuration in which a recording pulse train corresponding to a recording code length of 2T is stored additionally according to the recording medium and the recording apparatus. Moreover, in this embodiment, the differences between the recording code lengths and the effective recording pulse lengths are set to 2.315T to 2.685T, but even if this difference is set to 2T or so, a similar effect can be obtained. Furthermore, the ratio of the first pulse length to the first cooling pulse length ($T_{FP}/T_{FC}$) is set to approximately 1.25, but even if this ratio is set to 2 or so, a similar effect can be obtained.

According to the present invention, in the mark-length recording system where a mark smaller than a light spot size that is defined by λ/NA is used as a shortest mark, there can be offered the effect that the length and width of the record mark are controlled in a highly accurate manner regardless of variation in lengths of the record marks and spaces, which enables the information to be recorded densely, and the effect that the reliability of the information is improved.

What is claimed is:

1. An information recording method for recording information based on a mark-length recording system where laser light irradiates an information recording medium, an information-recorded portion being physically different from an information-unrecorded portion formed in a recording area on the information recording medium, and the information-recorded portion and one of the information-unrecorded portion or an erased portion are changed in length, and that performs recording, reproducing, and erasing of information on the information recording medium, the method comprising:
   a step of using a recording waveform for forming a record mark, which recording waveform is substantially composed of three pulses: a first pulse, an intermediate pulse, and a last pulse; and
   a step of controlling the recording waveform to satisfy:
      a relationship in which the length of the first pulse is less than two times as long as the length of a first cooling pulse;
      a sum of the length of the intermediate pulse and the length of an intermediate cooling pulse is 1T; and
      the intermediate pulse and the intermediate cooling pulse are sequentially added to an intermediate portion of the recording waveform of a recording code 6T, when the length of the recording code is more than 6T, where T is a reference clock period and a range of the mark-length is substantially 0.15–0.20 μm,
   wherein the recording is performed by using laser light having a wavelength of about 0.4 μm and produced by an apparatus having an NA of about 0.85, and
   wherein when the length of the recording code is greater than 6T, the ratio of an intermediate pulse length to a first cooling pulse length is less than 1.0 and the ratio of the intermediate pulse length to an intermediate cooling pulse length is less than 1.0.

2. The information recording method according to claim 1, wherein the recording waveform is controlled so that a pulse train formed by the intermediate pulse and the intermediate cooling pulse are added to the intermediate portion of the recording waveform of the recording code 6T.

3. An information recording method for recording information based on a mark-length recording system where laser light irradiates an information recording medium, an information-recorded portion being physically different from an information-unrecorded portion, and the information-recorded portion and one of the information-unrecorded portion and an erased portion are changed in length, and that performs recording, reproducing, and erasing of information on the information recording medium, the information recording method comprising:
   a step of using a recording waveform used for forming a record mark which is substantially composed of three pulses: a first pulse, an intermediate pulse, and a last pulse;
   a step of controlling the recording waveform to satisfy a relationship in which the length of a first cooling pulse is greater than the length of an intermediate cooling pulse; and
   a step of controlling the waveform so that a sum of the length of the intermediate pulse and the length of the intermediate cooling pulse is 1T, and the intermediate pulse and the intermediate cooling pulse are sequentially added to an intermediate portion of the recording waveform of a recording code 6T when the length of the recording code is more than 6T, where T is a reference clock period and a range of the length is substantially 0.15–0.20 μm, wherein the recording is performed by using laser light having a wavelength of about 0.4 μm and produced by an apparatus having an NA of about 0.85, and wherein when the length of the recording code is greater than 6T, the ratio of an intermediate pulse length to a first cooling pulse length is less than 1.0 and the ratio of the intermediate pulse length to an intermediate cooling pulse length is less than 1.0.

4. The information recording method according to claim 3, wherein the recording waveform is controlled so that a pulse train formed by the intermediate pulse and the intermediate cooling pulse are added to the intermediate portion of the recording waveform of the recording code 6T.

5. An information recording apparatus which records information based on a mark-length recording system where laser light irradiates an information recording medium, a recorded portion being physically different from an information-unrecorded portion, and the recorded portion and one of the information-unrecorded portion and an erased portion are changed in length, whereby the information is recorded, and that performs recording, reproducing, and erasing of information on the information recording medium the information recording apparatus comprising:

a laser light source to produce laser light for irradiation on the information recording medium; and a controller which controls a recording waveform used for forming a record mark which is substantially composed of three pulses: a first pulse, an intermediate pulse, and a last pulse, and the recording waveform is controlled so as to satisfy a relationship in which the length of the first pulse is less than two times as long as the length of a first cooling pulse, and is controlled so that a sum of the length of the intermediate pulse and the length of an intermediate cooling pulse is 1T and the intermediate pulse and the intermediate cooling pulse are sequentially added to an intermediate portion of the recording waveform of a recording code 6T when the length of the recording code is more than 6T, where T is a reference clock period and a range of the mark-length is substantially 0.15–0.20 μm, wherein the recording is performed by using laser light having a wavelength of about 0.4 μm and produced by an apparatus having an NA of about 0.85, and wherein when the length of the recording code is greater than 6T, the ratio of an intermediate pulse length to a first cooling pulse length is less than 1.0 and the ratio of the intermediate pulse length to an intermediate cooling pulse length is less than 1.0.

6. The information recording apparatus according to claim 5, wherein the recording waveform is controlled so that a pulse train formed by the intermediate pulse and the intermediate cooling pulse are added to the intermediate portion of the recording waveform of the recording code 6T.

7. An information recording apparatus which records information that is based on a mark-length recording system where laser light irradiates an information recording medium, a recorded portion being physically different from an information-unrecorded portion is formed in a recording area on the information recording medium, and the recorded portion and one of the information-unrecorded portion or an erased portion are changed in length, and that performs recording, reproducing, and erasing of information on the information recording medium or performs direct recording of different information in an already recorded region in an overwriting manner, wherein the information recording apparatus comprises:

a laser light source to produce laser light for irradiation on the information recording medium; and a controller which controls a recording waveform used for forming a record mark which is substantially composed of three pulses: a first pulse, an intermediate pulse, and a last pulse, and the recording waveform is controlled so as to satisfy a relationship in which the length of a first cooling pulse is greater than the length of an intermediate cooling pulse, and is controlled so that a sum of the length of the intermediate pulse and the length of the intermediate cooling pulse is 1T, and the intermediate pulse and the intermediate cooling pulse are sequentially added to an intermediate portion of the recording waveform of a recording code 6T when the length of the recording code is more than 6T, where T is a reference clock period, and a range of the mark-length is substantially 0.15–0.20 μm, and the information recording apparatus performs information recording by using the controlled recording waveform, wherein the recording is performed by using laser light having a wavelength of about 0.4 μm and produced by an apparatus having an NA of about 0.85, and wherein when the length of the recording code is greater than 6T, the ratio of an intermediate pulse length to a first cooling pulse length is less than 1.0 and the ratio of the intermediate pulse length to an intermediate cooling pulse length is less than 1.0.

8. The information recording apparatus according to claim 7, wherein the recording waveform is controlled so that a pulse train formed by the intermediate pulse and the intermediate cooling pulse are added to the intermediate portion of the recording waveform of the recording code 6T.

* * * * *